United States Patent [19]

Herr, Jr. et al.

[11] Patent Number: 4,605,584

[45] Date of Patent: Aug. 12, 1986

[54] DECORATIVE MATERIALS COMPRISING CRINKLED CHIPS

[75] Inventors: Richard E. Herr, Jr., Lancaster; William J. Kauffman, Penn Township, Lancaster County; Cheryl W. Landers, Mountville, all of Pa.

[73] Assignee: Armstrong World Industries, Inc., Lancaster, Pa.

[21] Appl. No.: 677,819

[22] Filed: Dec. 3, 1984

[51] Int. Cl.⁴ .................... B32B 3/00; B32B 27/08; B32B 27/20; B32B 27/22
[52] U.S. Cl. ................................ 428/142; 428/152; 428/203; 428/204; 428/206; 428/207; 428/208
[58] Field of Search .............. 523/206, 208; 428/201, 428/203, 204, 206, 207, 208, 327, 332, 500, 518, 142, 152; 524/439, 440, 430, 449, 569

[56] References Cited

U.S. PATENT DOCUMENTS

| | | | |
|---|---|---|---|
| 2,941,895 | 6/1960 | Haslam | 106/193 J |
| 2,945,770 | 7/1960 | Suchow | 106/193 J |
| 3,071,482 | 1/1963 | Miller | 106/193 J |
| 3,518,153 | 6/1970 | Slosberg et al. | 428/203 |
| 3,787,259 | 1/1974 | Kleinfeld et al. | 428/203 |
| 3,804,657 | 4/1974 | Eyman et al. | 428/203 |
| 4,126,727 | 11/1978 | Kaminski | 428/172 |
| 4,409,280 | 10/1983 | Wiley et al. | 408/207 |
| 4,454,188 | 1/1984 | Penta et al. | 428/103 |
| 4,501,783 | 2/1985 | Hirgamic et al. | 428/327 |

*Primary Examiner*—Allan M. Lieberman
*Attorney, Agent, or Firm*—Laird F. Miller

[57] ABSTRACT

The present invention relates to structures exhibiting unique appearances resulting from the presence of crinkled chip materials. A reflective and/or nacreous platelet or flake material is intermixed with a plasticizer and a general purpose resin, and the mixture is formed into a reflective sheet. The reflective sheet is pulverized to provide a chip material which is then used alone or in combination with other chips to form a mottle comprising a vinyl chloride resin and a plasticizer. Upon consolidating the mottle into a decorative surface, the nacreous and/or reflective chips are found to surprisingly exhibit an enhanced crinkled appearance, thereby exhibiting unique aesthetic properties.

15 Claims, No Drawings

DECORATIVE MATERIALS COMPRISING CRINKLED CHIPS

The present invention relates to decorative materials, and more particularly to decorative materials comprising chips which demonstrate a crinkled appearance.

BACKGROUND OF THE INVENTION

The production of decorative surface coverings using chip materials has long been known in the art. Vinyl floor coverings, in particular, have traditionally contained organic and/or inorganic chip materials of varying colors which have been used to provide pleasing patterns. For the most part, these chips have had a round granular appearance; however, recent references have described special effects which were obtained through the use of pearlescent flake materials.

THE PRIOR ART

Flake materials which demonstrate reflective and/or pearlescent properties have long been known in the art. For example, U.S. Pat. No. 3,138,475 disclosed scales or flakes of oxides or hydrated oxides of trivalent metals which produced interference phenomena comparable to mother-of-pearl. In addition, nacreous pigments and metallic flake pigments have been discussed in great detail by L. M. Greenstein in the Encyclopedia of Polymer Science and Technology, Volume 10., copyright 1969 by John Wiley and Sons, Inc. Laminar reflective platelets are also disclosed in U.S. Pat. No. 3,949,139.

Recent references have disclosed specialized uses for reflective and pearlescent chips. For example, U.S. Pat. No. 4,126,727 discloses a flooring structure in which pearlescent chips or flakes are placed over an alternating light and dark background pattern, thereby giving patterns in which the pearlescent materials are alleged to be invisible or visible, depending on the nature of the background. A different effect is disclosed in U.S. Pat. No. 4,409,280 wherein pearlescent materials are used to provide structures which demonstrate three-dimensional aesthetic effects.

Despite the interesting properties which can be displayed by structures comprising pearlescent and reflective materials, the materials which have been used have primarily constituted planar reflective materials whereby a fairly uniform reflective response was obtained. Applicants are aware of only one reference in which a non-planar effect was produced. U.S. Pat. No. 3,001,235 disclosed a process whereby formaldehyde polymers were formed into craped chips by placing a hot solution of the polymer on a metallic body, scraping the partially solidified material from the metallic body, and obtaining a polymeric material in crape chip form. However, in view of recent allegations regarding formaldehyde and formaldehyde-containing polymers, the use of such materials in providing decorative surfaces is severely restricted.

Accordingly, one objective of the present invention is to provide decorative particles in which the particles can be formed into decorative surfaces exhibiting an enhanced crinkled appearance.

Another objective of the present invention is to provide decorative surfaces, and particularly flooring surfaces, in which unique appearances heretofore unknown in the art are exhibited.

These and other advantages of the present invention will become apparent from the detailed description of preferred embodiments which follow.

SUMMARY OF THE INVENTION

The present invention relates to structures exhibiting unique appearances resulting from the presence of crinkled chip materials. A reflective and/or nacreous platelet or flake material is intermixed with a plasticizer and a general purpose resin, and the mixture is formed into a reflective sheet. The reflective sheet is pulverized to provide a chip material which is then used alone or in combination with other chips to form a mottle comprising a vinyl chloride resin and a plasticizer. Upon consolidating the mottle into a decorative surface, the nacreous and/or reflective chips are found to surprisingly exhibit an enhanced crinkled appearance, thereby exhibiting unique aesthetic properties.

DETAILED DESCRIPTION OF PREFERRED EMBODIMENTS

In one embodiment, the present invention relates to a compounded mottle derived from (a) a chip material having a substantially smooth and reflective surface and exhibiting pearlescent or metallic properties, said chip material being derived from a particulate material having reflective or pearlescent properties, a millable general purpose resin, and a plasticizer; (b) a particulate vinyl resin, and (c) a plasticizer, said particulate resin being selected such that said mottle is amenable to processing at 300° F. to provide a transparent vinyl matrix wherein said chips exhibit an enhanced crinkled appearance relative to the appearance of the uncompounded chips.

In a second embodiment, the present invention relates to a surface covering comprising enhanced visual effects, said covering comprising a consolidated compounded mottle comprising chips which exhibit a crinkled appearance, said mottle being derived from (a) a chip material having a substantially smooth and reflective surface and exhibiting pearlescent or metallic properties, said chip materials being derived from a particulate material having reflective or pearlescent properties, a millable general purpose resin, and a plasticizer, (b) a particulate vinyl resin, and (c) a plasticizer, said particulate resin being selected such that said mottle is amenable to processing at 300° F. to provide a transparent vinyl matrix wherein said chips exhibit an enhanced crinkled appearance relative to the appearance of the uncompounded chips.

In a third embodiment, the present invention relates to a stencil-vinyl flooring structure comprising a variety of pattern segments, at least a portion of said segments comprising a consolidated compounded mottle comprising chips which exhibit a crinkled appearance, said mottle being derived from (a) a chip material having a substantially smooth and reflective surface and exhibiting pearlescent or metallic properties, said chip material being derived from a particulate material having reflective or pearlescent properties, a millable general purpose resin, and a plasticizer, (b) a particulate vinyl resin, and (c) a plasticizer, said particulate resin being selected such that said mottle is amenable to processing at 300° F. to provide a transparent vinyl matrix wherein said chips exhibit an enhanced crinkled appearance relative to the appearance of the uncompounded chips.

In a fourth embodiment, the present invention relates to a process of preparing a surface covering comprising enhanced visual effects, said process comprising the steps of preparing a chip material having a substantially smooth and reflective surface and exhibiting pearlescent or metallic properties, said chip material being derived from a particulate material having reflective or pearlescent properties, a millable general purpose resin, and a plasticizer; intermixing said chip material with a particulate vinyl resin and a plasticizier to provide a compounded mottle; disposing said mottle on a support surface; and consolidating said disposed mottle using heat and pressure such that said chip material retains its reflective surface characteristics, said particulate resin being selected such that said mottle is amenable to processing at 300° F. to provide a transparent vinyl matrix wherein said chips exhibit an enhanced crinkled appearance relative to the appearance of the uncompounded chips.

The word "crinkled" as used herein is intended to imply that essentially each chip of material will exhibit a wrinkled or rippled appearance. In other words, in the final product, the chips will have an essentially non-planar surface which exhibits enhanced reflectance.

The invention may be practiced using materials which are presently well known in the art. As previously indicated, platelet materials which exhibit nacreous, or destructive interference, colors have long been known and are commercially available. Examples of such materials, which are referred to herein as "coated mica pearlescent pigments," are titanium dioxide-coated mica or other platelet materials which are coated with components such as bismuth oxychloride, lead arsenate, etc. Such materials are sold by the Mearl Corporation as "Flamenco" pigments. These materials may be obtained as platelets ranging in size from 1 to about 200 microns in width/length by 0.05 to about 10 micron in thickness. However, for purposes of the present invention, widths/lengths of about 1–60 microns are preferred.

Similarly, flake materials which exhibit a metallic appearance will also be suitable. For example, aluminum flakes and other flake or powder materials which exhibit a reflective brass, bronze, gold, or silver appearance are also well known in the art. Examples of such materials are those sold by Atlantic Powdered Metals, Inc. These materials will be referred to herein as pearlescent or reflective particles, and it will be apparent that their selection is well within the skill of the ordinary artisan.

When practicing the present invention, the particles are first compounded with a general purpose vinyl resin and a plasticizer. General purpose resins are well defined in the art; thus, ASTM D 1755-81 sets forth criteria which differentiate general purpose resins from dispersion grade resins. Plasticizers are also well-known in the art, and essentially any plasticizer may be utilized provided that it is compatible with the other components.

These three components are milled using conventional mixing equipment and the resulting material is formed to provide a sheet material which exhibits substantially smooth and reflective properties. Typically, 100 parts by weight of general purpose vinyl resin will be compounded with from about 20 to about 45 parts of plasticizer and from about 1 to about 5 parts of the particulate material. Nevertheless, U.S. Pat. No. 4,126,727 discloses other components and component ratios which may be used to prepare decorative chip materials; thus, the artisan will have wide latitude in preparing suitable chip materials.

The compounded material may be formed into a sheet by any of a variety of ways. For example, the material may be calendered to produce a sheet which has a smooth reflective surface, or it may be extruded to provide a thin sheet of material. As yet another alternative, a plastisol or organosol can be formed in which the reflective material is suspended, after which the organosol or plastisol is coated, such as by a blade coater, onto a surface, thereby providing a material with a substantially smooth reflective surface. With all of these alternatives, the object will be to provide a shear to the compounded materials such that the pearlescent or reflective particles will be oriented so as to yield a product in which the particles give a reflective surface. With platelet materials, the particles will preferably be aligned in a substantially planer fashion. The technology which may be used to form materials having smooth, reflective surfaces is well known in the art.

After the compounded material is formed into a sheet, the sheet is ground without heating to provide cold-ground chips. If the chips are less than about 25 mesh (U.S. Standard), they will be too small to ultimately provide a discernible crinkled appearance. Conversely, the chips preferably should not be larger than about ¼ inch in diameter. Typically, the reflective chips will be from about 1 to about 20 mils in thickness, but preferably between 5 and 15 mils in thickness.

After the cold-ground chips are formed, they are used to provide a mottle which will be suitable for formation into a decorative surface. The mottle may be obtained by mixing the cold-ground chips with a particulate vinyl resin and a plasticizer. Conventionally, the mottle will comprise a total of 100 parts of three basic components: from about 7 to about 30 parts by weight of resin; from about 91 to about 60 parts by weight of chips; and from about 2 to about 10 parts by weight of plasticizer. In addition, the mottle may also comprise conventional components such as stabilizers, antioxidants, pigments, and the like.

The resinous material which will be used to form the mottle will be a resin that is capable of flowing under pressure at a temperature of about 300° F. to form a transparent matrix which will have sufficient strength to serve as a flooring structure. This temperature limitation is intended to illustrate the physical character of the resin, and it is not intended to indicate that the resin cannot be processed at a higher temperature, if desired. It will also be apparent that conventional general purpose resins will be unsuitable to form a desired structure at such a low processing temperature.

As an added consideration, if the mottle will be used to form a stencil-vinyl product, it should also be capable of maintaining the shapes of the preformed pattern masses which are created during the stenciling process. This may best be described as a mottle having the consistency of damp sand such that, when a hand-full of the mottle is clutched firmly by hand and the hand is opened, the mottle will essentially retain its compressed shape.

A variety of resins are available which will be amenable to processing under pressure at 300° F. to provide a transparent sheet. Most such resins are solution-polymerized resins having a fairly low molecular weight because the resins must be maintained in solution during polymerization. These resins can form coatable solutions in a variety of organic solvents, and the films are transparent after the solvent is removed. Examples of such resins are the UCAR solution vinyl resins sold by Union Carbide.

Other resins which will demonstrate appropriate cohesive and compressive properties are also available. Examples of commercial resins are Tenneco 0565 resin (which is a copolymer dispersion resin) and Georgia Pacific EH240 resin (which is a modified emulsion resin). In addition, converted plastisol resins of the type disclosed in U.S. application Ser. No. 489,040, now abandoned, will also be suitable. In essence, the resin must act as an adhesive to hold the other components of the mottle together when they are formed into a final product, yet they must also be amenable to processing at 300° F. to provide a transparent product.

The chip material may be comprised entirely of the cold-ground reflective chips which were prepared as described above, or they may comprise a portion of such chips, the remainder being conventional chips which are used in the preparation of decorative surface coverings; i.e., they may be clear, translucent or opaque inorganic or organic chip materials. However, if other than clear chips are used, care must be taken to ensure that the reflective character of the crinkled chips is not obscured, and that the clear chips will be amenable to the processing conditions.

After the mottle is prepared, it may be used in a variety of ways. In one preferred method, the mottle may be used to form a stencil-vinyl product, and in particular a stencil-vinyl flooring product. Thus, the material is laid up in a pattern which typically has a thickness of from about 45 to about 235 mils and is then consolidated using heat and pressure to provide a stencil-vinyl product having a final thickness of from about 25 to about 125 mils. It is noted, however, that care must be taken when consolidating this material under pressure so as to avoid losing the reflective quality of the cold-ground chips.

As other alternatives, the mottle may be sprinkled over a backing material and consolidated, or it can be consolidated into a smooth surface, provided with a rotogravure print, and embossed. Further, the rotogravure print may be provided on the backing material to give an underlying pattern. The manner in which such materials can be used will be well within the skill of an ordinary artisan. In addition, the resulting structure may be provided with printed or unprinted transparent conventional wear layers.

The unique advantages which may be derived from practicing the present invention will become apparent from the examples which follow, said examples being provided by way of illustration and not limitation.

EXAMPLES

Example 1

This example will illustrate the preparation of cold-ground chips which may be used in the preparation of a mottle. The following components were blended in a Banbury mixer:

| Component | Parts by Weight | |
|---|---|---|
| | 1A | 1B |
| PVC Homopolymer resin (Occidental B282) | 100 | 100 |
| Dioctyl phthalate plasticizer | 30 | 30 |
| Tin stabilizer (Argus M-275) | 2 | 2 |
| Pearlescent TiO$_2$ coated mica | 1.3 | — |

| Component | Parts by Weight | |
|---|---|---|
| | 1A | 1B |
| flakes (Mearl Corporation, Superpearl pigment) | | |
| Metallic bronze powder, 37 micron (Atlantic Powdered Metals, Inc., Richpalegold No. 200) | — | 1.3 |

When the temperature of each mix reached 300° F., it was fed to a calender and sheeted off into a 10-mil gauge reflective sheet. Each sheet was cooled to room temperature and cold ground using a Taylor-Stiles rotating blade grinder to produce pearlescent or metallic chips having approximately the following size distribution.

| Screen Mesh (U.S. Standard) | Weight Percent Retained |
|---|---|
| 8 | 2.4 |
| 10 | 12.0 |
| 12 | 16.5 |
| 16 | 44.4 |
| 20 | 19.7 |
| 30 | 4.4 |
| Remnant | 0.5 |

Clear chips were also prepared in the same manner using all components except the pearlescent pigment and the metallic powder.

Example 2

This example will illustrate the preparation of mottles comprising the cold-ground chips. Five chip mottles were prepared using the following components.

| Component | Weight Percent | | | | |
|---|---|---|---|---|---|
| | 2A | 2B | 2C | 2D | 2E |
| Pearlescent chips (Example 1A) | 78 | 74 | 83 | 74 | — |
| Metallic chips (Example 1B) | — | — | — | — | 78 |
| Solution-polymerized PVC copolymer resin (Union Carbide VYHH) | 19.2 | — | — | — | 19.2 |
| Modified emulsion-polymerized homopolymer PVC resin (Georgia Pacific EH-240) | — | 18.2 | — | 9.1 | — |
| Dispersion grade copolymer PVC resin (Tennecco 0565) | — | — | 10.2 | 9.1 | — |
| Dioctyl phthalate plasticizer | 1.9 | 4.0 | 2.8 | 4.0 | 1.9 |
| Epoxidized soybean oil | 0.8 | 3.0 | 3.4 | 3.0 | 0.8 |
| Barium/Zinc fatty acid salt stabilizers (Synpron 1433) | 0.1 | 0.1 | 0.1 | 0.1 | 0.1 |

For each of the above mottles, the dry components were mixed in a Hobart mixer equipped with a wire wisk for five minutes to provide a uniformly distributed material. A blend of the liquid components was added over a three to five-minute time period, after which the mixture was stirred for an additional ten minutes. The resulting mottles were used to prepare a variety of products, as set forth in the following examples.

Example 3

This example will illustrate the preparation of a product comprising an enhanced crinkled appearance. For comparison, a pearlescent chip-containing product was also prepared which did not exhibit the enhanced crinkled appearance.

A flooring substrate was prepared consisting of a 20-mil thick felt backing covered with a consolidated 25-mil thick layer of 60% limestone-filled vinyl granules. The granules were prepared by hot grinding a filled, plasticized general purpose resin. Five samples were prepared by hand sprinkling mottles 2A–2E individually on separate backing samples, and a sixth control sample was prepared by sprinkling the cold-ground pearlescent chips of Example 1A on another substrate sample. Each of the sprinkled samples was provided with a 4-mil, clear urethane film on a release paper carrier by overlaying each sample with the film, consolidating each sample using a flatbed press, and then separating the release paper from the laminated product. The consolidation conditions were as follows: top platen 290° F.; bottom platen 260° F.; initial compaction—8 seconds at 900 psi; consolidation—6 seconds at 1200 psi. The products resulting from the use of mottles 2A–2E exhibited a micro-surface texture which demonstrated an enhanced crinkled visual effect relative to the control sample which did not show a significant crinkled effect.

Example 4

This example will illustrate the preparation of samples in which a multiple-layer mottle application is utilized. Mottles comparable to those of Examples 2A–2D were prepared, except that 50% of the cold-ground pearlescent chips of Example 1A were replaced by the clear chips of Example 1.

Each of the structures was prepared as follows: Onto a 25-mil thick flooring felt carrier was disposed approximately 70 mils of chip mottle using a shim and a roll bar. The composite material was overlaid with a 4-mil thick clear polyurethane wear layer on a release carrier and consolidation was effected as described in Example 3. After cooling, the release carrier was removed to provide a structure having a thickness of ca 65 mils.

In each of the test samples, the pearlescent chips residing at all levels in the structure could be seen to give a crinkled chip effect with enhanced reflectance. The result was an improved visual giving an impression of depth in the sample.

For comparison, a sample was prepared as described above, except that a 1:1 mixture of clear chips and pearlescent chips from Example 1 was used; i.e., the chips were not compounded with resin and plasticizer as set forth in Example 2. The chips were used to prepare a 70-mil thick chip layer as set forth above; however, the chip layer could not be consolidated. The resulting structure had no strength and was easily delaminated. In addition, essentially no crinkled appearance was observed. This illustrates that the preparation of a mottle using a suitable resin is necessary to provide appropriate adhesive properties for the final product and to provide the enhanced crinkled effect.

Example 5

This example will illustrate the preparation of a flooring structure having an overall stencil lay-up. A mottle was prepared having the composition of Example 2A except that 50% of the pearlescent chips were replaced by the clear chips of Example 1.

A six-foot wide release paper carrier was provided with a 40-mil layer of high density (38 pounds per cubic foot) chemically blown vinyl chloride polymer foam and an 80-mil layer of the mottle was applied using conventional stencil vinyl processing equipment. A rotogravure-printed 4-mil polyurethane wear surface on a release paper, and having a pattern of transparent and opaque inks, was interfaced with the mottle such that the printed surface was adjacent the mottle. The composite was initially compacted in a first flat-bed press for six seconds, and it was then embossed in register with the rotogravure print in a second press for eight seconds. The conditions of temperature and pressure were the same as those described in Example 3.

After cooling, the release carriers were separated from the structure to give a 95-mil thick product in which the underlying crinkled chips were masked by the opaque portions of the pattern, but in which the crinkled appearance was visible through the transparent portions of the pattern. In these latter regions enhanced depth and reflectance characteristics were clearly apparent.

The present invention is not restricted solely to the descriptions and illustrations provided above, but encompasses all modifications envisaged by the following claims.

What is claimed is:

1. A compounded mottle derived from
   (a) a chip material having a substantially smooth reflective surface and exhibiting pearlescent or metallic properties, said chip material being large enough to be retained on a 25-mesh screen (U.S. Standard) but being not greater than about 0.25 inch in diameter and being derived from a particulate material having reflective or pearlescent properties, a millable general purpose resin, and a plasticizer;
   (b) a particulate vinyl resin, and
   (c) a plasticizer, said particulate resin and proportions of (a), (b) and (c) being selected such that said mottle is amenable to processing at 300° F. to provide a transparent vinyl matrix wherein said chips exhibit an enhanced crinkled appearance relative to the appearance of the uncompounded chips, said mottle being in a loose, unconsolidated form.

2. The invention as set forth in claim 1 hereof wherein said chip material is derived from 100 parts by weight of general purpose resin, from about 20 to about 45 parts of plasticizer and from about 1 to about 5 parts of reflective or pearlescent particulate material.

3. The invention as set forth in claim 1 hereof wherein said mottle comprises from about 7 to about 30 parts of resin, from about 91 to about 60 parts of chips, and from about 2 to about 10 parts of plasticizer, said components comprising a total of 100 parts by weight.

4. The invention as set forth in claim 3 hereof wherein said particulate materials having reflective or pearlescent properties are selected from the group consisting of coated mica pearlescent pigments and particulate metallic materials.

5. The invention as set forth in claim 3 hereof wherein said particulate vinyl resin is selected from the group consisting of solution-polymerized copolymer PVC resins, modified emulsion-polymerized PVC resins, and copolymer dispersion PVC resins.

6. The invention as set forth in claim 3 hereof wherein said particulate vinyl resin is a converted plastisol-type resin.

7. A surface covering comprising enhanced visual effects, said covering comprising a consolidated compounded mottle comprising chips which exhibit a crinkled appearance, said mottle being derived from
   (a) a chip material having a substantially smooth and reflective surface and exhibiting pearlescent or metallic properties, said chip material being large enough to be retained on a 25-mesh screen (U.S. Standard) but being not greater than about 0.25 inch in diameter and being derived from a particulate material having reflective or pearlescent properties, a millable general purpose resin, and a plasticizer;

(b) a particulate vinyl resin, and (c) a plasticizer, said particulate resin and proportions of (a), (b) and (c) being selected such that said mottle is amenable to processing at 300° F. to provide a transparent vinyl matrix wherein said chips exhibit an enhanced crinkled appearance relative to the appearance of the uncompounded chips, said surface covering being in consolidated sheet form.

8. The invention as set forth in claim 7 hereof wherein said chip material is derived from 100 parts by weight of general purpose resin, from about 20 to about 45 parts of plasticizer and from about 1 to about 5 parts of reflective or pearlescent particulate material.

9. The invention as set forth in claim 7 hereof wherein said mottle comprises from about 7 to about 30 parts of resin, from about 91 to about 60 parts of chips, and from about 2 to about 10 parts of plasticizer, said components comprising a total of 100 parts by weight.

10. The invention as set forth in claim 9 hereof wherein said particulate materials having reflective or pearlescent properties are selected from the group consisting of coated mica pearlescent pigments and particulate metallic materials.

11. The invention as set forth in claim 9 hereof wherein said particulate vinyl resin is selected from the group consisting of solution-polymerized copolymer PVC resins, modiifed emulsion-polymerized PVC resins, and copolymer dispersion PVC resins.

12. The invention as set forth in claim 9 hereof wherein said particulate vinyl resin is a converted plastisol-type resin.

13. The invention as set forth in claim 7 hereof wherein said surface covering comprises a transparent wear layer.

14. The invention as set forth in claim 13 hereof wherein said surface covering comprises a printed pattern underlying said wear layer.

15. The invention as set forth in claim 14 wherein said pattern comprises regions of transparent and opaque color, said opaque regions substantially obscuring the underlying crinkled chips.

* * * * *